US008364863B2

(12) United States Patent
McGowan (10) Patent No.: US 8,364,863 B2
(45) Date of Patent: Jan. 29, 2013

(54) METHOD AND APPARATUS FOR UNIVERSAL SERIAL BUS (USB) COMMAND QUEUING

(75) Inventor: Steven B. McGowan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 257 days.

(21) Appl. No.: 12/317,019

(22) Filed: Dec. 18, 2008

(65) Prior Publication Data
US 2010/0011137 A1 Jan. 14, 2010

Related U.S. Application Data

(60) Provisional application No. 61/134,603, filed on Jul. 11, 2008.

(51) Int. Cl.
*G06F 3/00* (2006.01)
*G06F 15/16* (2006.01)
*G06F 13/00* (2006.01)
(52) U.S. Cl. ........... 710/52; 709/217; 709/234; 711/118
(58) Field of Classification Search ........................ None
See application file for complete search history.

(56) References Cited

U.S. PATENT DOCUMENTS

| | | | | |
|---|---|---|---|---|
| 5,682,553 A * | 10/1997 | Osborne | | 710/56 |
| 6,618,788 B1 * | 9/2003 | Jacobs | | 710/315 |
| 6,697,885 B1 * | 2/2004 | Goodfellow | | 710/22 |
| 6,889,262 B1 | 5/2005 | Gulick | | |
| 7,640,378 B2 * | 12/2009 | McLeod | | 710/29 |
| 2002/0091844 A1 * | 7/2002 | Craft et al. | | 709/230 |
| 2004/0260823 A1 * | 12/2004 | Tiwari et al. | | 709/230 |
| 2005/0033880 A1 | 2/2005 | Lin | | |
| 2005/0044286 A1 * | 2/2005 | Lim et al. | | 710/15 |
| 2005/0083968 A1 * | 4/2005 | Chan et al. | | 370/466 |
| 2005/0223118 A1 * | 10/2005 | Tucker et al. | | 709/250 |
| 2005/0243737 A1 * | 11/2005 | Dooley et al. | | 370/254 |
| 2008/0065791 A1 | 3/2008 | Ohnishi | | |
| 2008/0069097 A1 * | 3/2008 | Motegi | | 370/389 |
| 2009/0019505 A1 * | 1/2009 | Gopalakrishnan et al. | | 725/109 |

FOREIGN PATENT DOCUMENTS

| | | |
|---|---|---|
| WO | 2010/006043 A2 | 1/2010 |
| WO | 2010/006043 A3 | 4/2010 |

OTHER PUBLICATIONS

International Search Report and Written Opinion received for PCT Application No. PCT/US2009/049926, mailed on Feb. 17, 2010, Intel Corporation et al., 11 pages.
International Preliminary Report on Patentability received for PCT Application No. PCT/US2009/049926, mailed on Jan. 20, 2011, 6 pages.
European Search Report received for European Patent Application No. 09795116.4, mailed on Nov. 15, 2011, 4 pages.
"Universal Serial Bus Specification", Revision 2.0, Chapters 1-5 and 9, Apr. 27, 2000, 147 pages.
Office Action received for European Patent Application No. 09795116.4, mailed can Nov. 22, 2011, 4 pages.

* cited by examiner

*Primary Examiner* — Henry Tsai
*Assistant Examiner* — Michael Sun
(74) *Attorney, Agent, or Firm* — Konrad Raynes Davda & Victor LLP; David W. Victor (57) ABSTRACT

A method and apparatus for improving performance of mass storage class devices accessible via a Universal Serial Bus (USB) is presented. Performance is improved by providing support in a USB host to allow command queuing and First-Party DMA (FPDMA) to be supported in the mass storage class devices.

20 Claims, 7 Drawing Sheets

METHOD AND APPARATUS FOR UNIVERSAL SERIAL BUS (USB) COMMAND QUEUING

RELATED APPLICATIONS

This application claims the benefit of U.S. Provisional Application No. 61/134,603, filed on Jul. 11, 2008. The entire teachings of the above application are incorporated herein by reference.

FIELD

This disclosure relates to Universal Serial Bus (USB) and in particular to mass storage class USB devices.

BACKGROUND

The Universal Serial Bus (USB) is a serial bus standard that supports data exchange between a host computer and a plurality of simultaneously accessible devices such as peripherals which may be external to the host computer. USB devices include human interface devices, for example, mouse, keyboard, tablet and game controller, imaging devices, for example, scanner, printer and camera and storage devices, for example, Compact-Disk Read Only Memory (CD-ROM), floppy drive and Digital Video Disk (DVD).

A USB host initiates all data transfers to/from the USB devices accessible via the physical USB. A data transfer (transaction) is initiated when the host controller sends a USB packet that identifies the type and direction of the data transfer, the address of the USB device and an endpoint number in the device. An endpoint is a uniquely identifiable portion of a USB device that is the terminus of a communication flow between the USB host and the USB device. The endpoint direction may be IN (to host) or OUT (from host).

Data and control exchange between the USB host and the USB device is supported as a set of either unidirectional or bidirectional logical pipes. A logical pipe is a logical abstraction between the USB host and an endpoint in a USB device to exchange data and control packets between the USB host and the USB device. The USB device may transfer data over a plurality of logical pipes (pipe bundle) to a host, for example, there may be a separate unidirectional logical pipe for transporting data to an OUT endpoint in the USB device and another unidirectional logical pipe for transporting data to the USB host from an IN endpoint in the USB device.

Command sets from existing industry-standard storage protocols may be used to communicate between a USB host and a mass storage class USB device, for example, the Small Computer System Interface (SCSI) protocol. The SCSI protocol is a set of standards for transferring data between host systems and devices, such as, storage devices. SCSI defines communication between an initiator (for example, a host) and a target (for example, a device), with the initiator sending a command to the target. SCSI commands are sent from the initiator to the target encoded in a Command Descriptor Block (CDB). The CDB includes an operation code and command-specific parameters. The SCSI commands include read commands and write commands. After completion of a data transfer (for example, a transfer of write data to the target or a transfer of read data to the initiator), the target returns a status code indicating whether the command was successfully completed.

USB communicates with mass storage class USB devices by encapsulating SCSI commands in a USB wrapper (header) of a USB packet. For example, the command sets used by the USB host may be those defined by SCSI Primary Commands-2 (SPC-2).

A pair of unidirectional logical pipes are configured for transferring the SCSI CDB, SCSI status code and the data exchanged between the host and the mass storage class USB device. An IN pipe (between an endpoint in the USB device and the USB host) is configured to transfer data and command to the device. An OUT pipe (between the endpoint in the USB device and the USB host) is configured to transfer data and status from the device to the USB host. Each of the logical pipes is associated with a logical buffer in the host (initiator) for storing data to be transferred over the USB.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

An example of a mass storage class USB device is a hard disk drive (hard drive, hard disk or fixed disk drive). A hard disk drive includes a spindle which holds one or more flat circular disks (platters) with magnetic surfaces that store digitally encoded data. As the platters rotate at a rotational speed, for example, 4200 revolutions per minute (RPM), 3600 RPM, 7200 RPM or 5400 RPM, a read/write head is moved along the platters to read/write data from/to the platter. A hard disk drive is a block storage device with data transferred to/from the platters (storage media) in blocks of one or more sectors. A sector stores a fixed number of bytes, for example, 512 bytes or 1024 bytes.

There are many serial storage protocol suites such as, Serial Attached SCSI (SAS) and Serial Advanced Technology Attachment (SATA). A version of the SATA protocol is described in "Serial ATA: High Speed Serialized AT Attachment," Revision 1.0a, published on Jan. 7, 2003 by the Serial ATA Working Group. A version of the SAS protocol is described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (ANSI).

Typically, storage devices such as hard disk drives support queuing of multiple commands in the hard disk drive. As multiple commands received from the host may be queued in the hard disk drive, the hard disk drive may reorder the execution of the queued commands. For example, read commands and write commands stored in the command queue may be serviced in order of proximity to the current read/write head position instead of in the order that the commands are received. The ability to re-order commands stored in the command queue in the hard disk drive may result in a reduction of average access time.

A pair of unidirectional logical pipes is associated with a mass storage class USB device, an OUT logical pipe and an IN logical pipe. The SCSI Commands and Write Data are sent from the host to the device on the OUT logical pipe, and SCSI Completion Status and Read Data are sent from the device to the host on the IN logical pipe.

Each logical pipe is associated with a single logical buffer in memory in the host controller. Thus, a USB host may only issue a single command at a time to a hard disk drive. As only one command can be outstanding at a time, the command queuing and/or out-of-order command functions supported by the storage protocol in the hard disk drive cannot be used.

In an embodiment of the present invention, a USB host controller in a host computer supports management of a plurality of logical buffers per logical pipe to allow mass storage device command queuing and/or out-of-order command processing in a mass storage class USB device that is accessible over the USB physical bus.

Figure 1:
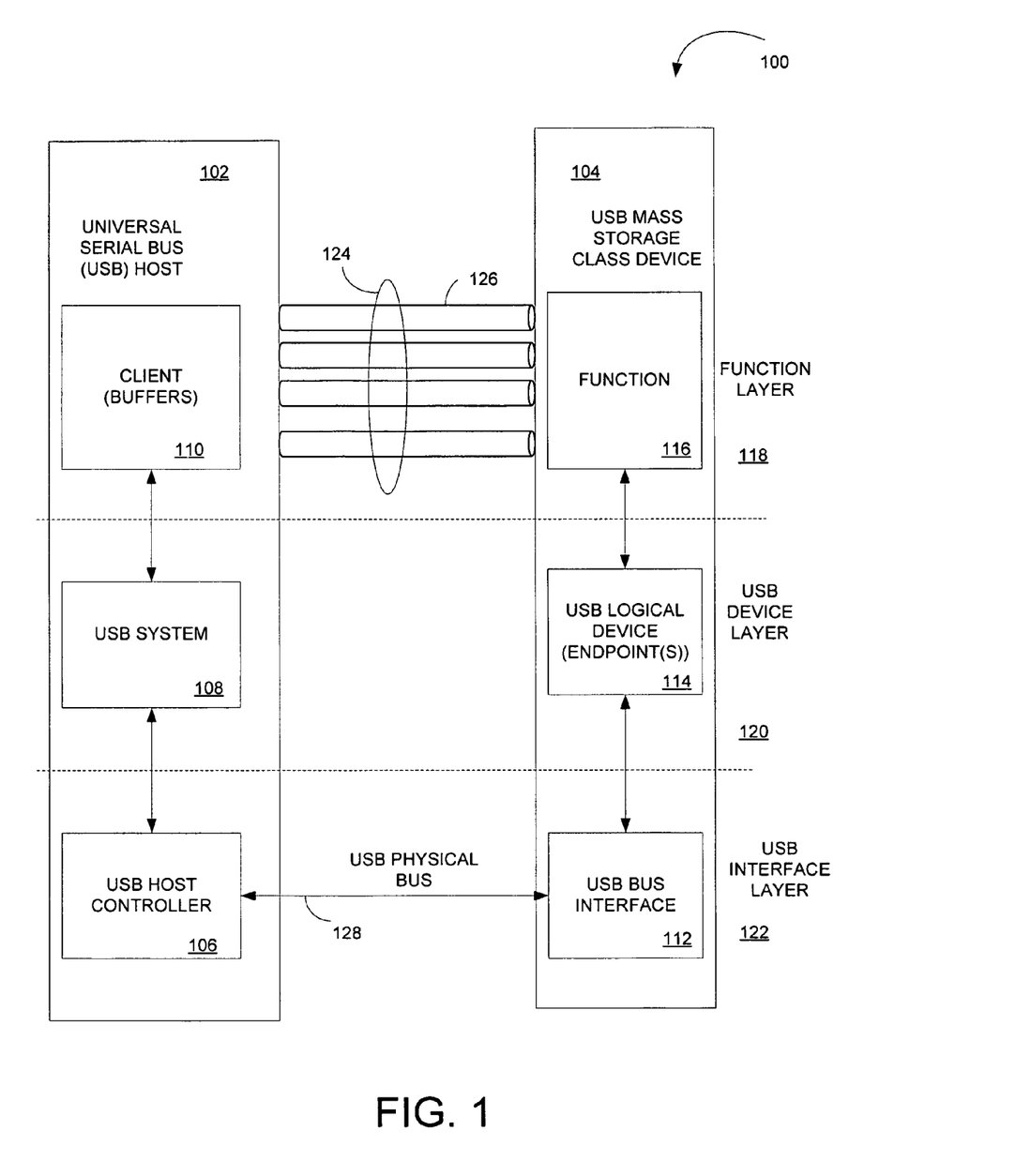
FIG. 1 is a block diagram of an embodiment of system that includes a USB host and a mass storage class USB device that provides support for command queuing and/or out-of-order command processing in the mass storage class USB device according to the principles of the present invention.

FIG. 1 is a block diagram of an embodiment of system 100 that includes a USB host 102 and a mass storage class USB device 104 that provides support for command queuing and/or out-of-order command processing in the mass storage class USB device 104 according to the principles of the present invention.

The USB host 102 includes a USB host controller 106, USB system 108 and a client 110. The USB device 104 includes a USB bus interface 112, a USB logical device 114 and a function 116. The USB logical device 114 includes one or more USB endpoints.

In an embodiment the USB device 104 is a mass storage class USB device, for example, a disk drive, Digital Video Disk (DVD) drive, compact disk (CD) drive, Redundant Array of Independent Disks (RAID), tape drive or other mass storage class storage device.

The USB host 102 communicates with the USB logical device 114 in the USB device 104 over the USB physical bus 128 via one of a set of communication flows (logical pipes) 126 also referred to a pipe bundle 124. As discussed earlier, a logical pipe is a logical abstraction between the USB host and an endpoint in a USB device to exchange data and control packets between the USB host and the USB device.

The fundamental element of communication on the USB physical bus 128 is a USB packet that includes a start, information and an end. The packet information may include 1 to 1025 bytes with the first byte storing a packet identifier. There are four categories of packet identified by the packet identifier: token, data, handshake and special. Token packets are used to set up data packets which are acknowledged by handshake packets. A handshake packet indicates the status of a data transaction. Handshake packet types include ACK which indicates successful reception of token or data packet and NACK which indicates that the receiver cannot accept the packet because, for example, the receiver may be busy or may not have resources to handle the packet.

A USB logical device 114 has a plurality of independent endpoints. An endpoint in the USB logical device 114 is the terminus of a communication flow between the USB host 102 and the USB device 104. Each endpoint may have one direction of data flow (that is, IN from device to host or OUT to device from host). A USB pipe (logical pipe) 126 is an association between an endpoint on a USB device and the client 110 in the USB host 102. A logical pipe 126 represents the ability to move data between a buffer in the client 110 in the USB host 102 and the endpoint in the USB device 104.

The client 110 in the USB host 102 includes memory, a portion of which is allocated for each endpoint to provide a logical buffer to store data to be transferred (moved to or from) the USB device 104. There is a 1:1 mapping of a logical buffer to a USB endpoint associated with a pipe 124.

As shown in FIG. 1, the functions performed by the system 100 may be divided into a plurality of layers: a USB bus interface layer 122, a USB device layer 120 and a USB function layer 118.

The USB bus interface layer 122 provides physical connectivity between the USB host 102 and the USB device 104. The USB device layer 120 performs generic USB operations. The USB function layer 118 provides additional capabilities to the USB host 102 and the USB device 104.

At the function layer 118, the USB provides a communication service between the client 110 in the USB host 102 and the function 116 in the USB device 104. The client 110 requests that data be moved across the USB over one of the set of logical pipes ("pipe bundle") 124. The data is physically transferred over the physical USB bus 128 by the interface layer 122.

At the interface layer 122, dependent on the direction of transfer, either the host controller 106 or the USB bus interface 112 packetizes the data prior to sending it across the USB physical bus 128.

In an embodiment of the invention, at the logical layer 118, a pipe bundle 124 having four logical pipes 126 is defined by the USB device 104 to move SCSI commands, data and status between the client 110 and the function 114 in the USB device 104.

Each of the logical pipes in the pipe bundle 124 is configured as a "bulk transfer" type pipe (bulk pipe), that is, a pipe that supports the transfer of large amounts of data at variable times that can use any available bandwidth. A bulk pipe is a unidirectional stream pipe (IN or OUT). A standard bulk pipe is described in the USB 2.0 standard. A stream bulk pipe will be described later in conjunction with FIG. 3. A stream bulk pipe provides the ability to move a stream of data between the host and a device using a stream protocol that allows out-of-order data transfers for mass storage device command queuing.

The four logical pipes 126 in the pipe bundle 124 are defined as follows: (1) a logical pipe between the client and a standard bulk OUT endpoint for sending commands to the mass storage class USB device 104; (2) a logical pipe between the client and a stream bulk IN endpoint for data transfers associated with read commands from the mass storage class USB device 104 to the USB host 102; (3) a logical pipe between the client and a Stream Bulk OUT endpoint for data transfers associated with write commands from the USB host to the mass storage class USB device, and (4) a logical pipe between the client 110 and a Stream Bulk IN endpoint for transfers associated with command completions. In one embodiment, the logical pipe associated with command completions is a standard Bulk IN pipe.

Figure 2:
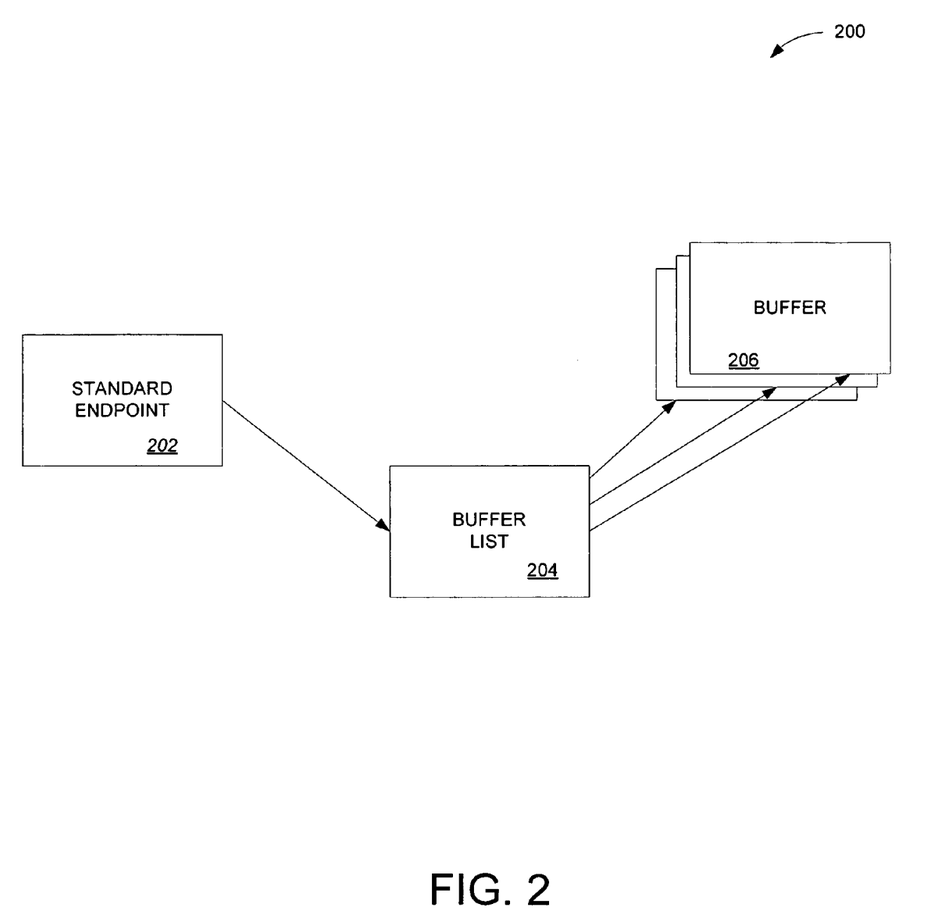
FIG. 2 is a block diagram of the client side of a standard bulk pipe in the pipe bundle shown in FIG. 1.

FIG. 2 is a block diagram of the client 110 side of a standard bulk pipe 200 in the pipe bundle 124 shown in FIG. 1. The device 104 sees a single logical buffer in the host 102. A buffer list 204 allows the logical buffer to be defined as a plurality of physical buffers 206. The standard bulk pipe 200 includes an endpoint 202 that includes a buffer list 204, which defines a set of buffers 206 in memory in the host 102 that data transferred over the USB physical bus 128 is moved to or from. The standard bulk pipe 200 is used to transfer data to/from (between) a standard endpoint 202 in the USB device 104 from/to (between) one or more buffers 206 in the buffer list 204 in the client 110 in the USB host 102. The buffer list 204 provides pointers to each of the buffers 206 allocated for the standard bulk pipe 200. The data stored in buffers 206 referenced by the buffer list 204 is transferred sequentially. The direction of transfer of standard bulk pipe 200 is initialized as either IN or OUT and the standard bulk pipe 200 uses the buffer list 204 to transfer data sequentially in the respective direction, that is, IN or OUT to/from the buffers 206 in memory in the host 102. In an embodiment, the standard bulk pipe 200 is used to transfer SCSI commands to the mass storage class USB device 104. In another embodiment, the standard bulk pipe 200 is used to transfer Advanced Technology Attachment (ATA) commands to the mass storage class USB device 104

In an embodiment of the invention, in addition to a standard bulk pipe that defines a single buffer list 204 per USB endpoint, a stream bulk pipe may be defined between a USB device 104 and a USB host 102 to define multiple buffer lists per USB endpoint, which enables out-of-order command processing in the USB device 104.

Figure 3:
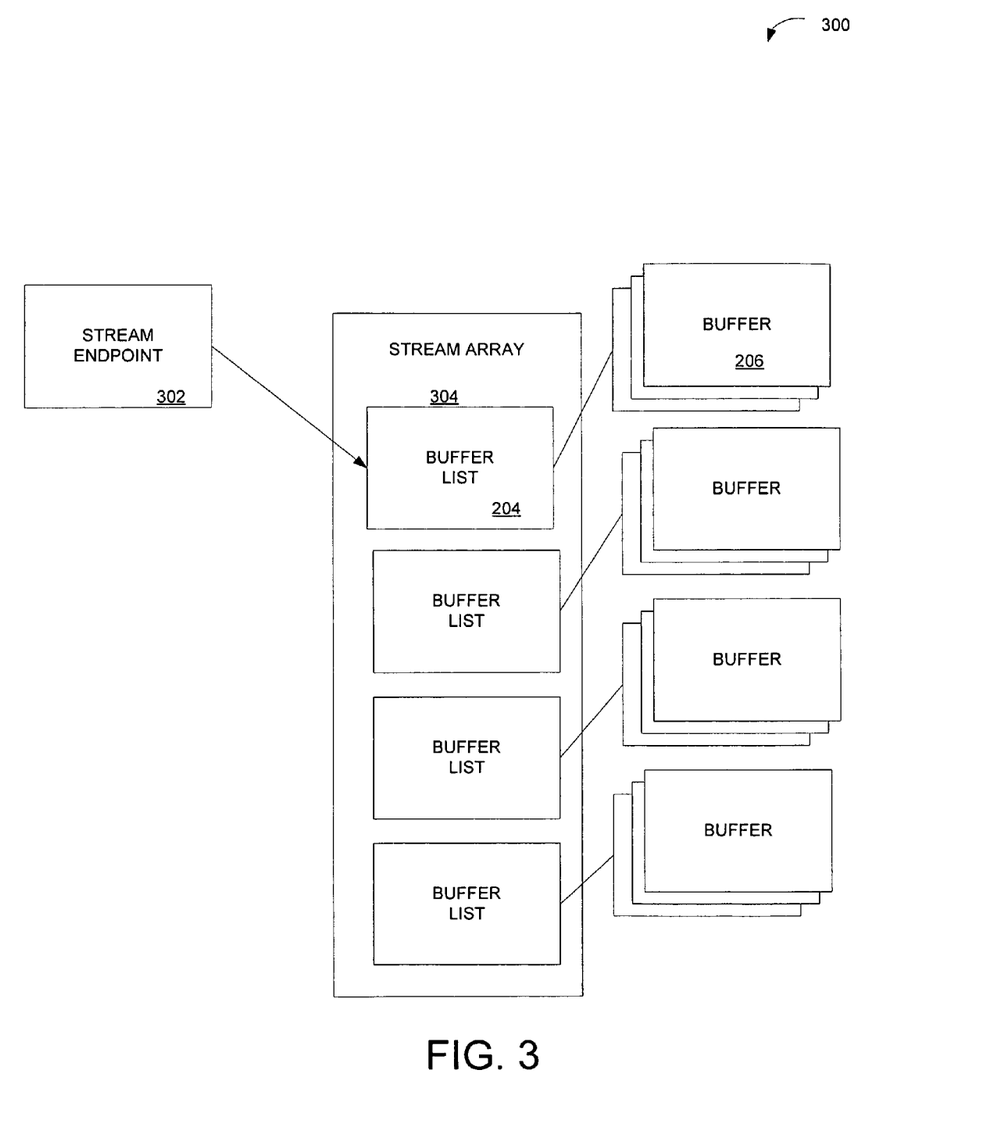
FIG. 3 is a block diagram of an embodiment of a stream bulk pipe according to the principles of the present invention.

FIG. 3 is a block diagram of an embodiment of a stream bulk pipe 300 according to the principles of the present invention.

The stream bulk pipe 300 includes a stream array 304 and a stream endpoint 302. The stream array 304 includes a set of buffer lists 204 associated with a stream endpoint 302. A stream defines an association between a USB data transfer and a buffer list 204 in a stream array 304 and has an associated stream identifier.

Referring to FIG. 2, the standard bulk pipe 200 is associated with a single buffer list 204 in memory in the host 102, that is, all data transferred over the standard bulk pipe 200 is moved to or from a single set of memory buffers.

Returning to FIG. 3, in contrast to the standard bulk pipe 200 shown in FIG. 2, a stream array 304 associated with the stream bulk pipe 300 allows a plurality of memory buffer lists 204 to be associated with a single stream endpoint 302, and thus allows the USB device to route data to/from a particular memory buffer list 204.

Each buffer list 204 in the stream array 304 is identified by a unique stream identifier. The stream identifier allows multiple USB host processes to access the same USB endpoint, and also allows the host controller 106 in the host 102 and the stream endpoint 114 in the device 104 to transfer data directly between their respective address spaces (endpoint to/from host buffer(s)).

The stream identifier may be stored in a stream identifier (SID) field in a USB packet header to distinguish the stream that is associated with the USB packet. The stream identifier may also used as an index into the stream array 304 to select one of the buffer lists 204 from the stream array 304. One entry in the stream array 304 is provided for each stream supported by a stream endpoint 304.

Through the use of a stream pipe and associated stream identifiers, a USB device 104 can effectively re-order commands because the USB device can select one of the plurality of buffer lists associated with the stream endpoint based on a particular stream identifier to transfer to/from. In an embodiment, both the host 102 and the device 104 include a stream protocol state machine (SPSM) for managing stream endpoints in stream pipes. The stream protocol state machine will be discussed in conjunction with FIG. 4.

Figure 4:
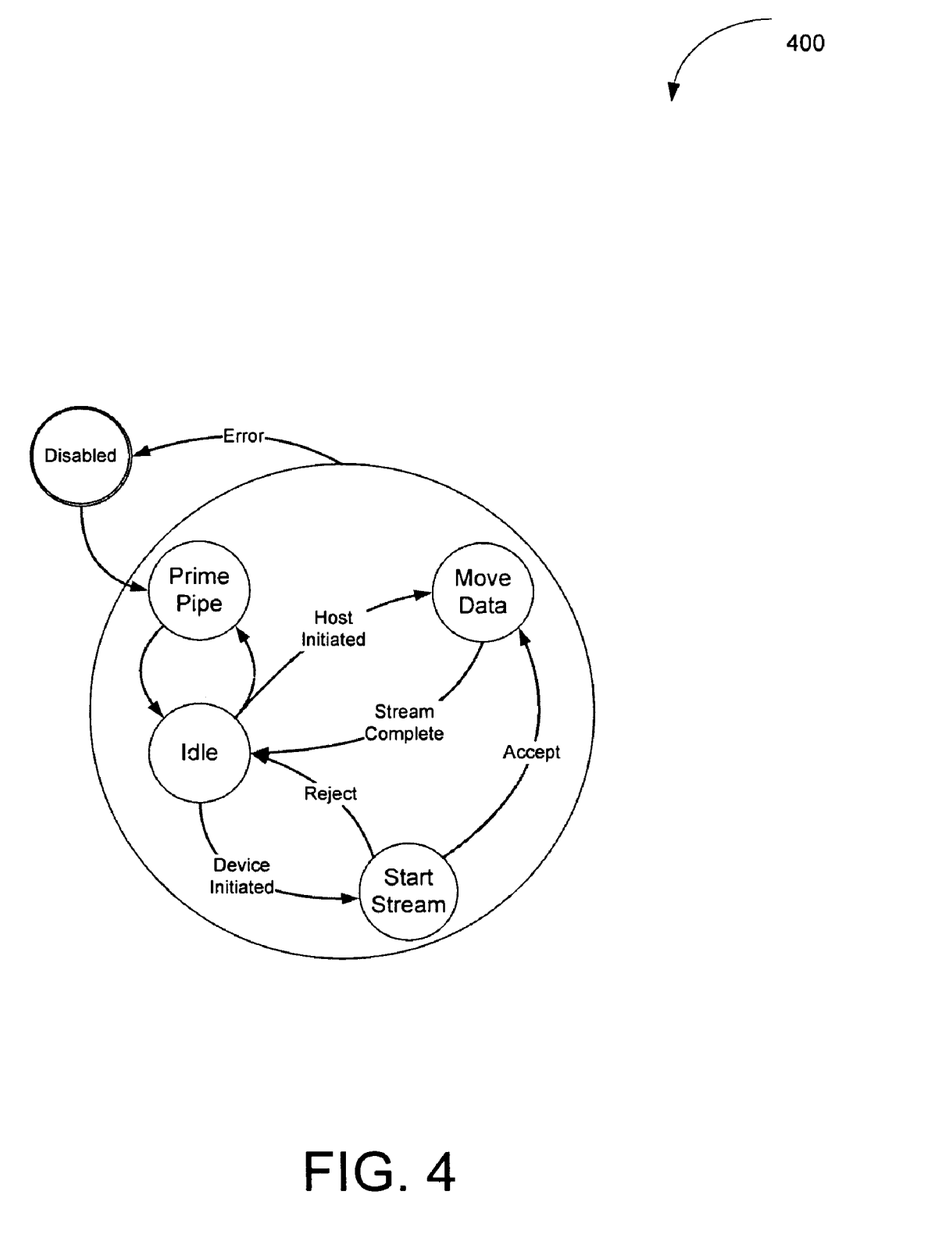
FIG. 4 is a state diagram that illustrates an embodiment of a stream protocol state machine for IN or OUT stream endpoint stream servicing for a stream bulk pipe.

FIG. 4 is a state diagram that illustrates an embodiment of a stream protocol state machine 400 for IN or OUT stream endpoint stream servicing for a stream bulk pipe 300. As discussed earlier, the data transfer direction for an IN data transfer is to the host, that is, physical buffers in memory in the host 102 receive function data from the device 104 and the data transfer direction for an OUT data transfer is from the host 102.

As discussed earlier, data packets transferred between the host 102 and a stream endpoint in the device 104 include a stream identifier field in a header of the packet to identify a stream associated with the data transfer. In addition, transaction packets are defined to pass stream identifiers between the host 102 and the device 104. In an embodiment, four packet types are provided: DP, ACK, NRDY and ERDY. For an IN pipe, the host generates ACK packets and the device generates DP packets. For an OUT pipe, the host generates DP packets and the device generates ACK packets. A "host transaction packet" refers to an ACK or a DP packet depending on whether the pipe is an IN pipe or an OUT pipe, respectively. A "device transaction packet" refers to a DP or an ACK packet depending on whether the pipe is IN pipe or an OUT pipe, respectively. A "USB packet" is a generic reference to any packet type.

As shown in FIG. 4, the state machine has five states labeled as follows: disabled, prime pipe, idle, start stream and move data. The disabled state is the initial state of the stream protocol state machine after the stream endpoint in the device 104 has been configured by the host 102. A transition to another state may be initiated by either the host 102 or the device 104 through the use of a USB packet.

The prime pipe state is initiated by the host 102 to inform the device 104 that a buffer list 204 has been added or modified by the host 102. After posting a buffer list 204 to the stream endpoint 302, the host 102 sends a host transaction packet, that results in a transition of the stream protocol state machine 400 to the prime pipe state. The device 104 responds with an NRDY packet that results in a transition to the idle state.

While the stream protocol state machine 400 is in the idle state there is no stream identifier selected. In the idle state, the stream protocol state machine 400 waits for a host initiated transition to prime pipe state or move data state, or for a device initiated transition to the start stream state. As discussed earlier, the host initiated and device initiated transitions are performed through the use of transaction packets that originate in either the host 102 or the device 104. The host and device initiated transitions provide the current stream identifier so that the stream pipe can begin moving data to/from physical buffers 206 in memory in the host 102 that are associated with the stream identifier. The current stream identifier is used to identify the buffer list that is used by the host to move data. Thus, the current stream identifier may be selected by either the host or the device dependent on whether the data transfer is initiated by the host or the device.

While in the idle state, the device 104 may issue an ERDY packet to transition the stream protocol state machine to the start stream state. The stream identifier that is passed to the host in the ERDY packet is used by the host to initiate a data transfer (IN or OUT) to/from the buffer(s) 206 associated with the stream identifier. If a valid buffer list 204 exists for the stream identifier, the host 102 initiates the data transfer, and the stream protocol state machine 400 transitions to the move data state. If a valid buffer list does not exist for the stream identifier, the host 102 sends a transaction packet to the device 104 indicating that the data transfer has been rejected and the stream protocol state machine returns to the idle state. If the device 104 is ready to transfer data for the stream identifier, the device 104 acknowledges the transfer with a transaction packet, and the stream protocol state machine 400 transitions to the move data state. In the move data state, the transfer continues until the host 102 exhausts the buffer list 204 associated with the stream identifier, or the device 104 completes the data transfer associated with the stream identifier. In either case, the stream protocol state machine 400 transitions to the idle state.

In contrast to the host initiated data transfer that results in a transition from the idle state to the move data state, the start stream state is initiated by the device 104 to select a stream (list of buffers associated with the stream endpoint) and start a data transfer. If the device selected stream is accepted by the host; the stream protocol state machine transitions to the move data state to transfer data for the current stream identifier. If the device selected stream is rejected by the host 102, the stream protocol state machine 400 returns to the idle state.

In the move data state, data for a particular stream associated with a stream endpoint 302 in a device 104 is transferred between the host 102 and the device 104. A current stream identifier that is used to select the stream for which data is being moved is maintained by both the host 102 and the device 104. Valid stream identifier values are encoded by the host 102 and passed to the device 104. These values may be passed to the host through an out-of-band, device class defined method. For example, valid Stream identifier values are passed to the device 104 with the SCSI command that is sent over the logical bulk pipe in the pipe bundle 124 allocated for sending SCSI commands to the mass storage class device 104. These values are out-of-band because they are not passed to the device on the stream bulk pipe. In other embodiments, the stream identifiers may be passed to the device on an OUT stream bulk pipe.

The data is transferred to the buffer 206 associated with the stream identifier. The use of the stream identifier allows data to be transferred for streams in any order because there is a separate buffer list 204 assigned per stream identifier. Thus, two processes A and B may each be assigned a unique stream identifier allowing the commands for each of the respective processes to be completed out-of-order.

In the move data state, data associated with the currently selected stream is transferred IN or OUT. If the move data state is entered by a host initiated stream selection, the stream is selected by the host 102. If the move state is entered from the start Stream state, the stream is selected by the device 104. The stream protocol state machine 400 transitions back to the idle state after the data transfer for the stream is complete, or if the host 102 or the device 104 terminates the data transfer for the stream. The transition to idle state invalidates the selected stream for the data transfer over the stream bulk pipe.

A stream is selected by a stream identifier value that is stored in a stream identifier field. The stream identifier field may be included in a header of a data packet or an in-band control packet. For example, the stream identifier may be stored in a field (one or more bits) in the packet header that is not currently used by the USB 3.0 protocol, or an Extended transaction format USB 2.0 packet. In an embodiment, the stream identifier value is associated with the SCSI command. Each SCSI command sent to the device includes a stream identifier and the device 104 uses that stream identifier to identify the data packets and status packets moved to/from the host 102 that are associated with the SCSI command. In an embodiment for the ATA storage protocol, the stream identifier is associated with an ATA command.

Reserved values of the stream identifier may indicate that the stream identifier is not valid, for example, the Prime identifier is reserved for transitioning in and out of a prime pipe state, or the No Stream identifier indicates the host rejection of a device initiated stream selection.

The stream protocol state machine 400 may transition to the disabled state upon detection of an error in any another state. This error condition may be handled in the disabled state prior to transitioning to another state.

Figure 5:
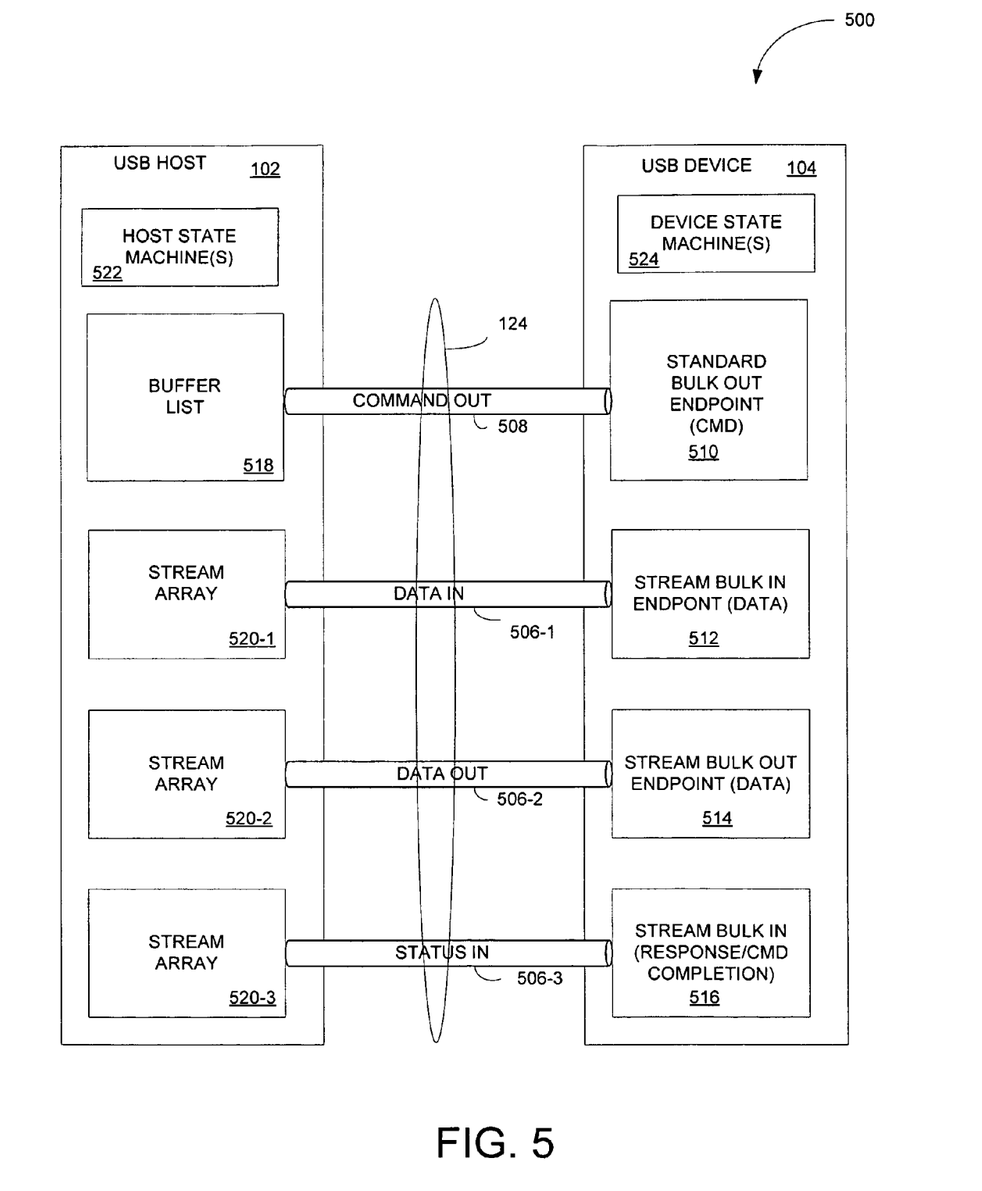
FIG. 5 is a block diagram of an embodiment of system that includes a USB host and a mass storage class USB device communicating via a pipe bundle including stream pipes to provide support for command queuing and/or out-of-order command processing in the mass storage class USB device.

FIG. 5 is a block diagram of an embodiment of system 500 that includes a USB host 102 and a mass storage class USB device 104 communicating via a pipe bundle 124 including stream pipes to provide support for command queuing and/or out-of-order command processing in the mass storage class USB device 104.

The pipe bundle 124 includes a standard bulk pipe ("Command OUT") 508 between the client 102 and a standard bulk OUT endpoint 510 for sending commands to the mass storage class USB device 104. The pipe bundle 124 also includes a first stream bulk pipe ("Data IN") 506-1 between the client 102 and a Stream Bulk IN endpoint 512 for transferring data associated with read commands from the mass storage class USB device to the host 102 and a second stream bulk pipe ("Data OUT") 506-2 between the host 102 and a Stream Bulk OUT endpoint 514 for transferring data associated with write commands from the USB host 102 to the mass storage class USB device 104. The pipe bundle 124 also includes a third stream bulk pipe ("Status IN") 506-3 between the host 102 and a Stream Bulk IN endpoint 516 for transferring response data associated with command completions. Each of the respective stream bulk pipes 506-1, 506-2, 506-3 has a corresponding stream array 520-1, 520-2, and 520-3 in memory in the host 102.

Upon receiving a command (for example, a SCSI command or an ATA command) from a host process to read data stored in the mass storage class USB device 104, the host 102 assigns a stream identifier to the command. The stream identifier is used to identify the command, and the response (for example, SCSI status) and data buffers in memory in the host 102 allocated for the command. The command is stored in a buffer in the buffer list 518 associated with the standard bulk pipe 508 assigned to logically transport commands from the host 102 to the mass storage class USB device 104.

Dependent on the command type, (that is, whether the command results in a data transfer to or from the mass storage class USB device 104), a list of buffers associated with an entry corresponding to the stream identifier is allocated for the command in one of the stream arrays 520-1, 520-2 associated with a stream bulk pipe for data transfer. An entry in the stream array 520-3 associated with a stream bulk pipe for responses 506-3 is also allocated for the command.

The mass storage class USB device 104 may queue commands received from the host 102 and may process the queued commands in any order. When the mass storage class USB device 104 is ready for data transfer (IN or OUT) over one of the stream bulk pipes ("Data IN, Data OUT) 506-1, 506-2, the data is transferred to/from the data buffer(s) in the data buffer list in the stream array allocated for the particular command based on the stream identifier provided by the command.

The use of stream identifiers and stream arrays 520-1, 520-2, 520-3 allows a plurality of host software processes to queue commands in the same stream bulk endpoint, and also allows the host controller 106 in the host 102 and an endpoint in the device 104 to transfer data using direct memory accesses (DMA) between their respective address spaces. In addition, a device may initiate a host DMA operation for a data transfer without any host intervention. For example, the device may select the DMA context (that is, buffer list) by sending a transaction packet with a stream identifier to the host to change state to the start stream state. The stream identifier specifies the location of the data in the host to/from which the data is to be transferred. Based on the Stream identifier value, the host controller 106 loads the appropriate buffer list pointer (address) in the stream array into a DMA controller in the host and the DMA transfer proceeds without any processor intervention. This mechanism provides a means by which a USB device can effectively re-order commands because it can select a specific buffer in the host to transfer data to, based on a stream identifier. For example, in an embodiment for a mass storage class device that supports the ATA or SATA storage protocol, the stream identifier provides support for first-party direct memory access (FPDMA) to allow the device to transfer data directly between the device and buffers in the host.

In addition to allowing support for command queuing in the mass storage class USB device 104, the use of stream identifiers also allows a specific core, in a system having a plurality of cores, to be selected for processing the completion of the command.

A variety of host and device stream service algorithms known to those skilled in the art, for example, stream prioritization schemes, may be used to select the next stream to be serviced. These schemes are beyond the scope of the present invention.

Figure 6:
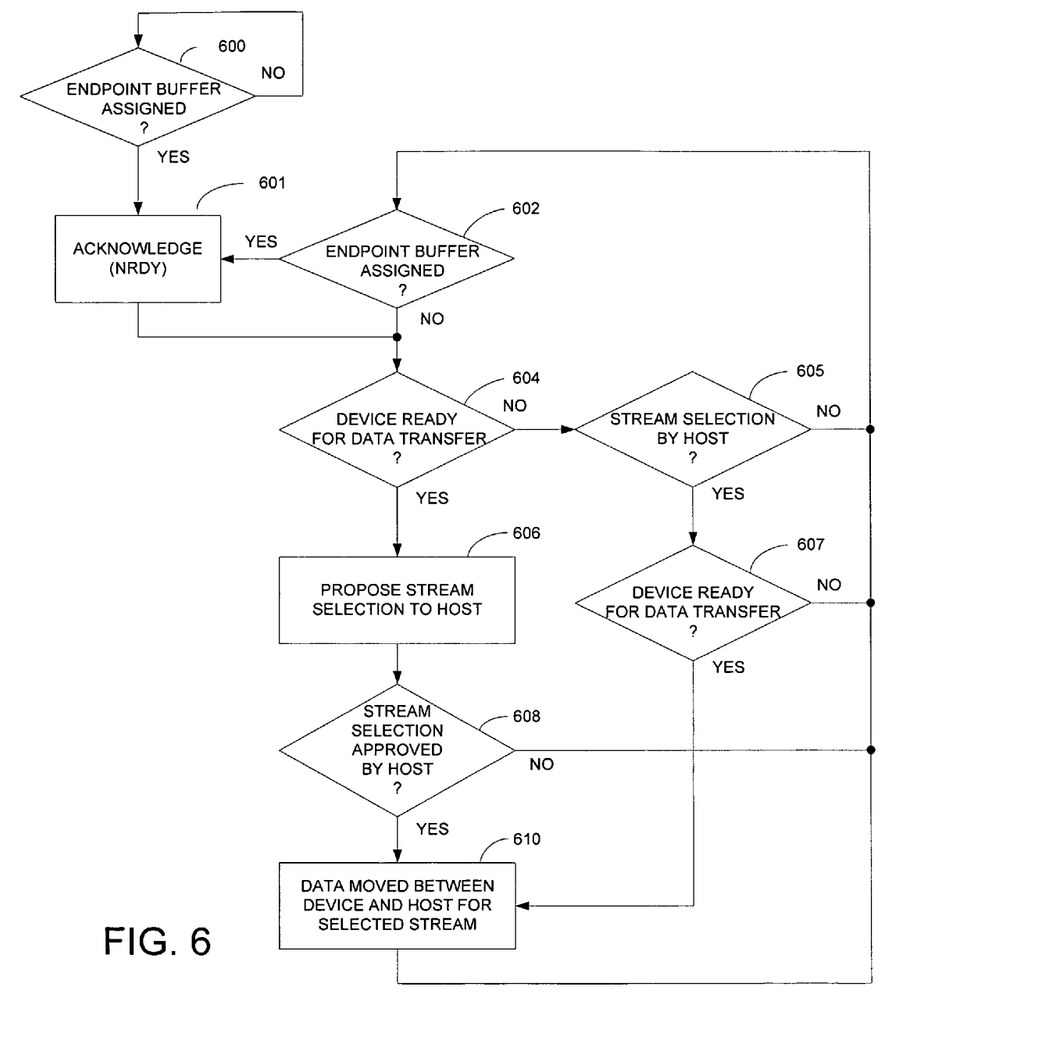
FIG. 6 is a flow chart illustrating an embodiment of a method implemented in the device for transferring data on a logical pipe between the device and the host.

FIG. 6 is a flow chart illustrating an embodiment of a method implemented in the device for transferring data on a logical pipe between the device 104 and the host 102. The data transfer may be over an IN pipe or an OUT pipe. In an IN pipe, endpoint buffers 206 in a host receive data from the device. In an OUT pipe endpoint buffers 206 in a host store data to be transferred to the device.

At block 600, the device 104 waits for the initial endpoint buffer to be configured (assigned) for the logical pipe by the host 104. After an endpoint buffer is configured, the host issues a transaction packet to the device 104 with the stream identifier in the host transaction packet set to "prime" to inform the target that the endpoint buffer is assigned. The "prime" host transaction packet is issued the first time that endpoint buffers are assigned to the pipe by the host 102. Upon receiving the "prime" host transaction packet, processing continues with block 602.

At block 602, in response to receiving the "prime" host transaction packet, indicating that the endpoint buffer has been assigned by the host 102, the device 104 sends an NRDY packet to the host with the stream identifier set to "prime" indicating that it has recorded that the host has a stream ready to transfer data. Processing continues with block 604.

At block 604, if the device 104 has a stream ready to transfer data, the device 104 may propose a stream selection for which a data transfer may be initiated by host 102. If the stream selection is initiated by the device 104, processing continues with block 606. If not, processing continues with block 605.

At block 605, a stream selection for which to transfer data may be initiated by host 102. To initiate a stream selection, the host 102 issues a host transaction packet to the device 104 with stream identifier set to "stream n". The host 102 may initiate a stream selection if the endpoint buffer that was assigned is for the last proposed stream identifier, for example, to resume a data transfer for a stream identifier that needs an additional endpoint buffer to be allocated by the host 102. If the stream selection is initiated by the host 102, processing continues with block 607. If not, processing continues with block 602.

At block 606, the device 104 either requests that it start a stream transfer to the host or that the host 102 start a stream transfer to the device. To request a stream transfer, the device 104 issues an ERDY packet to the host with stream identifier set to "stream n" (valid stream) and a stream number greater than 0. Processing continues with block 608.

At block 607, the device 104 determines if the stream proposed by the host is ready to transfer data. If the stream is ready, processing continues with block 610. If not, processing continues with block 602.

At block 608, the device 104 waits for the host 102 to accept or reject the stream selection proposed by the device. A host transaction packet with stream identifier set to "stream n" indicates that the host 102 has accepted the proposed stream. If the stream is accepted, processing continues with block 610. If the stream is not accepted, the device 104 receives a host transaction packet with stream identifier field set to "no stream".

In an embodiment, the host 102 rejects a stream selection by the device 104 if there are no endpoint buffers available for the device selected stream identifier. The host 102 may initiate a previously proposed stream selection after assigning endpoint buffers for the stream identifier. If the stream selection is rejected by the host, processing continues with block 602.

At block 610, the stream identifier is set at both the host end and the device end, and data is moved from/to the device to the endpoint buffers allocated for the stream on the host for the pipe. Data is moved while endpoint buffers are available for the stream in the host and the device has data to be moved to the host for the stream or the host has data to be moved to the device for the stream.

The "idle" loop is comprised of the blocks 602, 604, and 605. In this loop the device checks for a prime pipe transition 602, a device initiated transfer 605, or a host initiated transfer 605.

Figure 7:
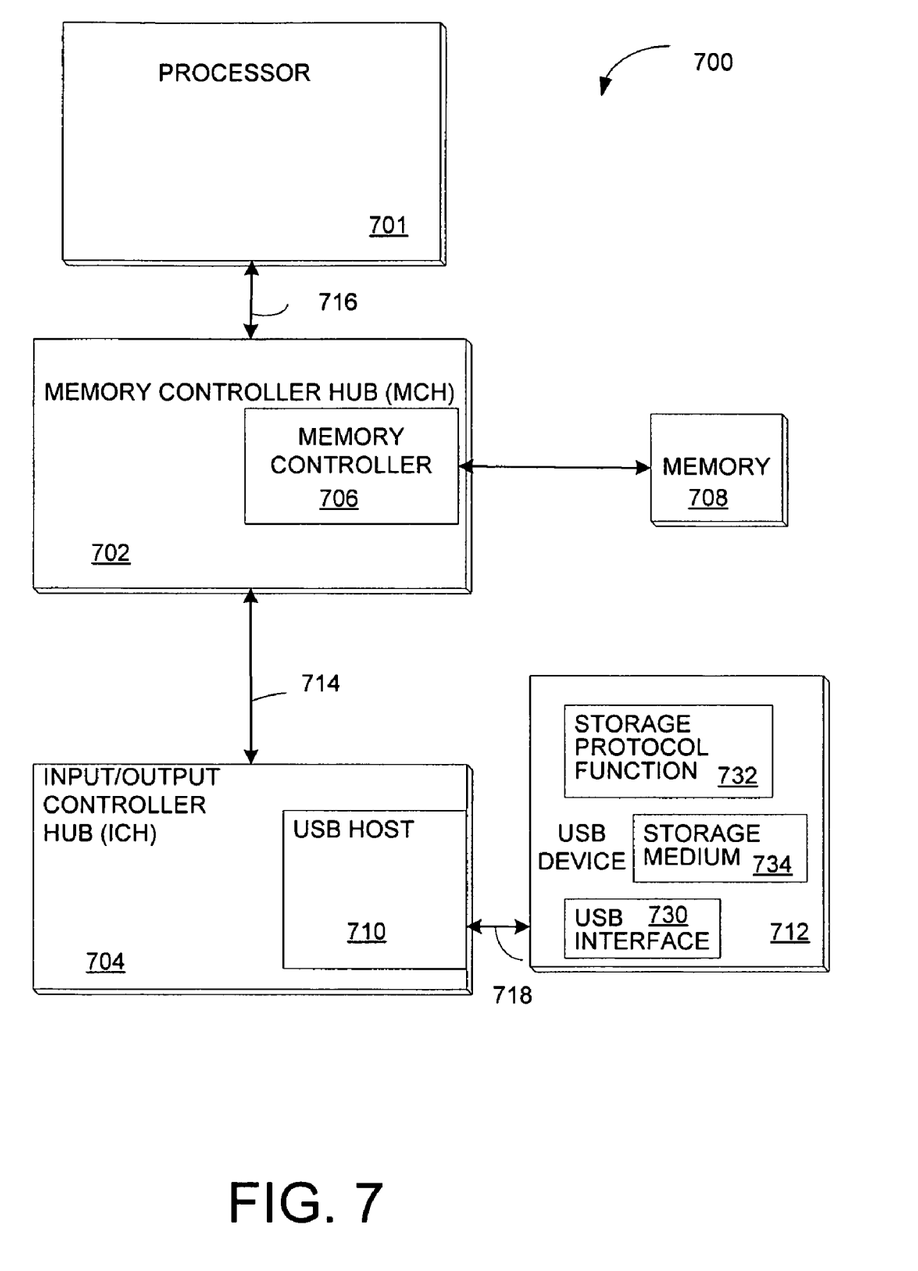
FIG. 7 is a block diagram of a system that includes a USB host and a USB device that provides support for command queuing and/or out-of-order command processing in the USB device.

FIG. 7 is a block diagram of a system that includes a USB host 710 and a USB device 104 that provides support for command queuing and/or out-of-order command processing in the USB device 104. The USB device 104 includes a USB interface 730, a storage protocol function 732 and a storage medium 734. In an embodiment, the storage protocol function 732 performs SATA protocol related storage functions. In another embodiment, the storage protocol function 732 performs SCSI protocol related functions. The storage medium 734 includes one or more platters (storage medium) to store data.

The system 700 includes a processor 701, a Memory Controller Hub (MCH) 702 and an Input/Output (I/O) Controller Hub (ICH) 704. The MCH 702 includes a memory controller 706 that controls communication between the processor 701 and memory 708. The processor 701 and MCH 702 communicate over a system bus 716. In an alternate embodiment, the functions in the MCH 702 may be integrated in the processor 701 and the processor 701 coupled directly to the ICH 704.

The processor 701 may be any one of a plurality of processors such as a single core Intel® Pentium IV® processor, a single core Intel Celeron processor, an Intel® XScale processor or a multi-core processor such as Intel® Pentium D, Intel® Xeon® processor, Intel® Core® Duo processor, or any other type of processor.

The memory 708 may be Dynamic Random Access Memory (DRAM), Static Random Access Memory (SRAM), Synchronized Dynamic Random Access Memory (SDRAM), Double Data Rate 2 (DDR2) RAM, Rambus Dynamic Random Access Memory (RDRAM), or any other type of memory.

The ICH 704 may be coupled to the MCH 702 using a high speed chip-to-chip interconnect 714 such as Direct Media Interface (DMI), or any other type of chip to chip interface. DMI supports 2 Gigabit/second concurrent transfer rates via two unidirectional lanes.

The ICH 704 may include a Universal Serial Bus (USB) host controller 710 for controlling communication with at least one USB mass storage class USB device 712 coupled to the ICH 704. The ICH 704 may communicate with the USB mass storage class USB device 712 over a USB physical bus 718 using a storage protocol such as, Small Computer System Interface (SCSI) or ATA by encapsulating SCSI/ATA commands, data and SCSI/ATA status in USB packets.

An embodiment of the invention has been described for the Universal Serial Bus. However, the invention is not limited to the Universal Serial Bus; an embodiment of the invention may be used by any bus protocol that supports command queuing and out-of-order completions, or any master/slave bus protocol that supports slave initiated selection of host buffer lists/buffers.

An embodiment of the invention may also be used for core targeting of completion interrupts. For example, in an embodiment for a system that uses the Peripheral Component Interconnect (PCI), an interrupt vector may be allocated for each buffer list 204, and the Buffer List selected using a stream identifier. A PCI MSI-X interrupt vector may specify a core and a vector on that core.

In a multi-core system, a SCSI command is constructed on a particular core, which means that the core's cache stores information related to the specific command. Core Targeting allows the host controller to interrupt the core that initiated the command with the completion for the command, so the information stored in cores' cache can be reused. If the completion is sent to another core, additional system memory activity is incurred while the "other" core loads the information related to the command. Core Targeting reduces memory and power utilization.

Alternative embodiments of the invention also include machine-accessible media containing instructions for performing the operations of the invention. Such embodiments may also be referred to as program products. Such machine-accessible media may include, without limitation, storage media such as floppy disks, hard disks, Compact Disk-Read Only Memories (CD-ROMs), Read Only Memory (ROM), and Random Access Memory (RAM), and other tangible arrangements of particles manufactured or formed by a machine or device. Instructions may also be used in a distributed environment, and may be stored locally and/or remotely for access by single or multi-processor machines.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method comprising:
allocating a plurality of buffer lists of buffers in a host to store data to be moved over a stream bulk pipe between the host and a device, wherein at least one of the allocated buffer lists is associated with a plurality of buffers, wherein the buffer lists are associated with a stream identifier identifying the stream bulk pipe to move a stream of data between the host and a device using a stream protocol that allows out-of-order data transfers; and
selecting one of the buffer lists associated with the stream identifier of the stream bulk pipe to transfer data over the stream bulk pipe between the device and the buffers in the buffer lists associated with the stream identifier.

2. The method of claim 1, further comprising:
allowing the stream identifier for the data transfer to be selected by either the host or the device.

3. The method of claim 2, further comprising:
transferring a command from the host to the device over a bulk logical pipe; and
transferring status from the device to the host over a status stream bulk pipe.

4. The method of claim 3, wherein the stream bulk pipe is a data-in stream bulk pipe to transfer data from the device to the host.

5. The method of claim 3, wherein the stream bulk pipe is a data-out stream bulk pipe to transfer data from the host to the device.

6. The method of claim 1, wherein the device is a mass storage class Universal Serial Bus device.

7. An apparatus comprising:
a plurality of buffer lists of buffers allocated in a host to store data to be moved over a stream bulk pipe between the host and a device, wherein at least one of the allocated buffer lists is associated with a plurality of buffers, wherein the buffer lists are associated with a stream identifier identifying the stream bulk pipe to move a stream of data between the host and a device using a stream protocol that allows out-of-order data transfers; and
control logic to select one of the buffer lists associated with the stream identifier of the stream bulk pipe to transfer data over the stream bulk pipe between the device and the buffers in the buffer lists associated with the stream identifier.

8. The apparatus of claim 7, wherein the control logic allows the stream identifier for the data transfer to be selected by either the host or the device.

9. The apparatus of claim 8, further comprising: control logic to transfer a command from the host to the device over a standard bulk logical pipe and to receive status from the device over a status stream bulk pipe.

10. The apparatus of claim 7, wherein the stream bulk pipe is a data-in stream bulk pipe to transfer data from the device to the host.

11. The apparatus of claim 7, wherein the stream bulk pipe is a data-out stream bulk pipe to transfer data from the buffer to the device.

12. The apparatus of claim 7, wherein the device is a mass storage class Universal Serial Bus (USB) device.

13. A system comprising:
a dynamic random access memory;
a plurality of buffer lists of buffers allocated in a host to store data to be moved over a stream bulk pipe between the host and a device, wherein at least one of the allocated buffer lists is associated with a plurality of buffers, wherein the buffer lists are associated with a stream identifier identifying the stream bulk pipe to move a stream of data between the host and a device using a stream protocol that allows out-of-order data transfers; and control logic to select one of the buffer lists associated with the stream identifier of the stream bulk pipe to transfer data over the stream bulk pipe between the device and the buffers in the buffer lists associated with the stream identifier and the control logic to allow the stream identifier for the data transfer to be selected by either the host or the device.

14. The system of claim 13, wherein the host is a Universal Serial Bus (USB) host and the device is a mass storage class USB device.

15. A method comprising:

receiving an Advanced Technology Attachment (ATA) command from a host over a command pipe, the ATA command encapsulated in a universal serial bus protocol packet, the universal serial bus protocol packet including a stream identifier associated with buffer lists of buffers allocated in the host to store data associated with the ATA command, wherein at least one of the buffer lists is associated with a plurality of buffers;

storing the ATA command and the associated stream identifier;

processing the ATA command by transferring data over a data stream bulk pipe, associated with the stream identifier, between a non-tangible storage medium in the device and the buffers in one of the buffer lists selected by the device or the host, wherein the buffer lists, associated with the stream identifier, are associated with the data stream bulk pipe to move a stream of data between the host and a device using a stream protocol that allows out-of-order data transfers; and forwarding ATA command status and the associated stream identifier to the host encapsulated in a universal serial bus protocol packet over a status stream bulk pipe.

16. The method of claim 15, wherein another received ATA command is processed prior to processing the stored ATA command.

17. The method of claim 15, wherein first-party direct memory access is used to transfer the data over the data stream bulk pipe.

18. The method of claim 15, wherein, the host is a Universal Serial Bus (USB) host and the device is a mass storage class USB device.

19. A method comprising:

receiving a Small Computer Systems Interface (SCSI) command from a host over a command pipe, the SCSI command encapsulated in a universal serial bus protocol packet, the universal serial bus protocol packet including a stream identifier associated with buffer lists of buffers allocated in the host to store data associated with the SCSI command, wherein at least one of the buffer lists is associated with a plurality of buffers;

storing the SCSI command and the associated stream identifier;

processing the SCSI command by transferring data over a data stream bulk pipe, associated with the stream identifier, between a non-tangible storage medium in the device and the buffers in one of the buffer lists selected by the device or the host, wherein the buffer lists, associated with the stream identifier, are associated with the stream bulk pipe to move a stream of data between the host and a device using a stream protocol that allows out-of-order data transfers; and forwarding SCSI command status and the associated stream identifier to the host encapsulated in a universal serial bus protocol packet over a status stream bulk pipe.

20. The method of claim 19, wherein another received SCSI command is processed prior to processing the stored SCSI command.

* * * * *